US006085937A

United States Patent [19]

Hutchinson et al.

[11] Patent Number: 6,085,937

[45] Date of Patent: Jul. 11, 2000

[54] "GOLF BALL VENDOR" AND "ALTERNATE" PRODUCT VENDOR

[75] Inventors: John Hutchinson; William Fulwiler, both of Saskatoon, Canada

[73] Assignee: Premium Products Ltd., Saskatoon, Canada

[21] Appl. No.: 09/012,009

[22] Filed: Jan. 22, 1998

[51] Int. Cl.[7] .............................. G07F 11/00; B65G 59/00

[52] U.S. Cl. ........................... 221/122; 221/155; 221/299

[58] Field of Search ...................................... 221/105, 119, 221/121, 122, 155, 299

[56] References Cited

U.S. PATENT DOCUMENTS

| | | | |
|---|---|---|---|
| 2,099,267 | 11/1937 | Hackett | 221/122 |
| 2,309,674 | 2/1943 | Schloff | 221/122 |
| 2,338,335 | 1/1944 | King | 221/122 |
| 2,696,324 | 12/1954 | Jones | 221/122 |
| 3,785,524 | 1/1974 | Smith | 221/122 |
| 4,676,397 | 6/1987 | Hoffmeister | 221/105 |
| 5,339,985 | 8/1994 | Perez | 221/121 |
| 5,605,249 | 2/1997 | Gonyea | 221/121 |

*Primary Examiner*—H. Grant Skaggs
*Attorney, Agent, or Firm*—Murray E. Thrift; Adrian D. Battison

[57] ABSTRACT

Disclosed is a coin operated vending machine for individual golf ball or similarly sized product, includes a rotating carousel for holding stacks of product within a housing with an enclosed main display compartment and a slide assembly for dispensing product from the carousel into a dispensing area. A carousel including a plurality of vertical guides for containing a stacked array of individual golf ball units therein, is rotatably supported within the main display compartment such that each of the guides is selectively positional in vertical alignment over a drop hole below the slide assembly, the drop hole being sized and configured to receive an individual, lower most product unit dropped from the aligned guide. A conventional type coin released lock mechanism is provided which is structured to accept coins to release the slide assembly for inward movement to the extended position, causing the individual golf ball product within the drop hole to be carried from below the aligned guide to a drop chute where it is deposited thereon and dispensed to the user.

4 Claims, 13 Drawing Sheets

FRONT VIEW

FRONT VIEW

LEFT SIDE VIEW

REAR VIEW

RIGHT SIDE VIEW

TOP VIEW

CROSS SECTION "A" – "A"

SECTION "B" – "B"

SECTION "C" - "C"

SECTION "D" - "D"
FIG. 9
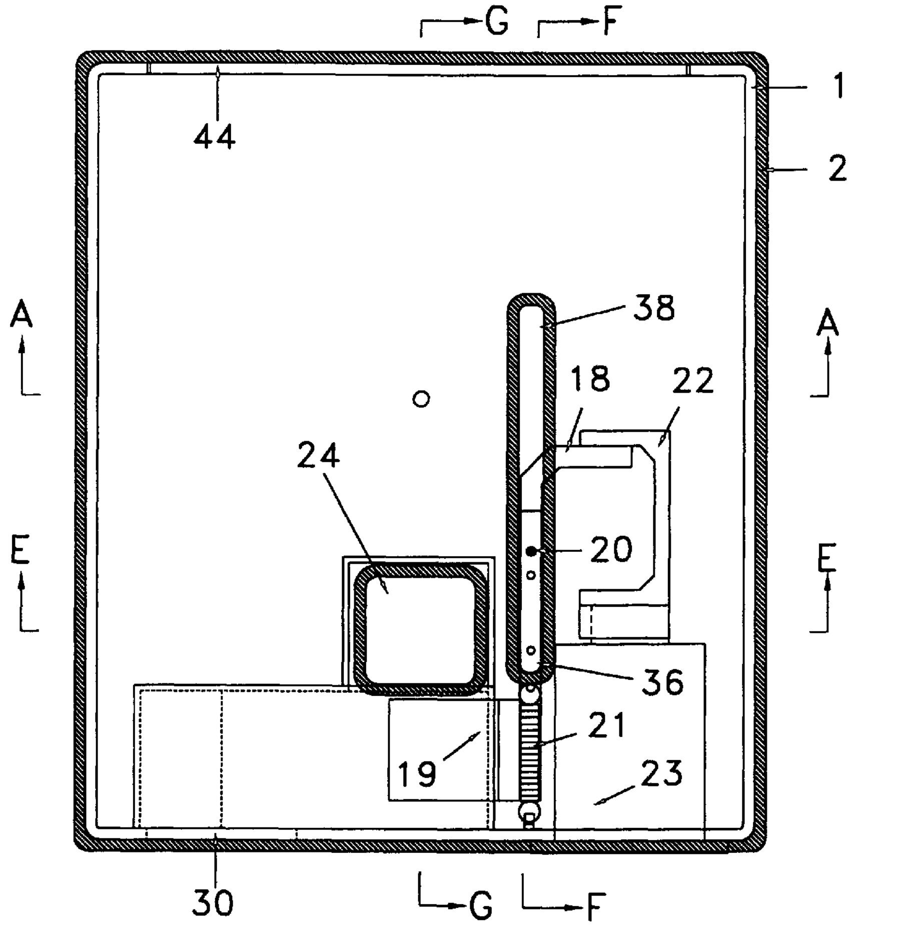
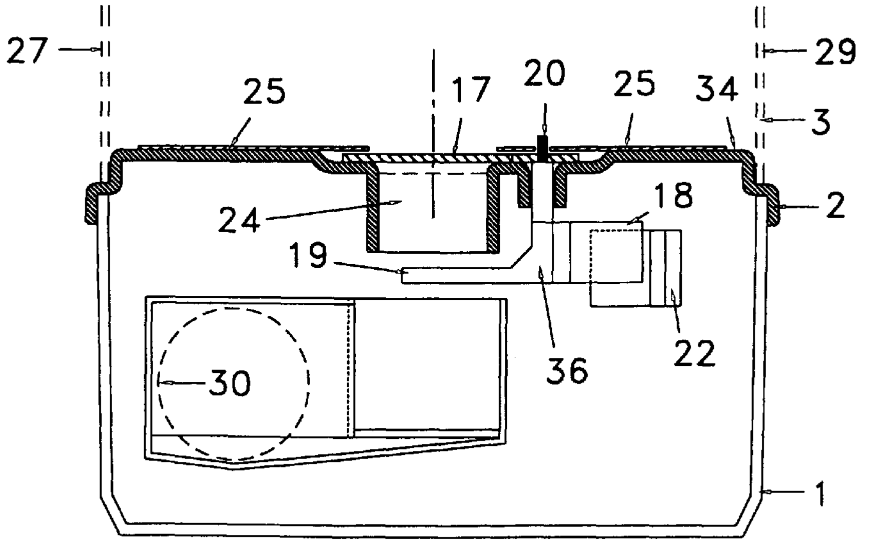
CROSS SECTION "E" - "E"
FIG. 10

CROSS SECTION "F" - "F"

CROSS SECTION "G" - "G"

CROSS SECTION "G" – "G"

TOP VIEW

SECTION 'A' – 'A'

SECTION 'B' – 'B'

FRONT VIEW

TOP VIEW

TOP VIEW

SECTION 'A' – 'A'

SECTION 'A' – 'A'

FRONT VIEW

TOP VIEW

TOP VIEW

LEFT SIDE VIEW

FRONT VIEW

TOP VIEW

"GOLF BALL VENDOR" AND "ALTERNATE" PRODUCT VENDOR

BACKGROUND OF THE INVENTION

1. Field of the Invention

This invention relates to coin operated vending apparatus for dispensing an individual product unit upon deposit of coins therein.

2. Background of the Invention

There exist a variety of vending machines from which a "customer" can obtain a desired product by self-operation of the machine. The types of such machines range from simple mechanical versions to more elaborate electrically controlled versions. The object of all such machines, however, is to present a simple procedure by which a customer can obtain a desired product from the machine and at the same time to provide a reliable operation and ease of maintenance. One type of vending apparatus being widely used today because of its low cost utilizes a rotatable carousel from which products are dispensed. The carousel in such an apparatus typically includes a plurality of longitudinal vertically disposed guides in a circle to form a multi-sided cylinder, each guide being arranged to hold a plurality of products stacked on top of the other. Selection of a particular product from such apparatus is carried out by rotating the carousel to align the guide containing the desired product with a product display window and the operating of a dispensing mechanism (e.g. a pull knob) which causes the desired product to be ejected to a receptacle accessible by the customer. One problem encountered with the typical carousel type vending machine is that of jamming if the carousel is improperly aligned when an attempt is made to operate the dispensing mechanism. In any case, such machines often times will not operate if the carousel is not fairly precisely aligned.

SUMMARY OF THE INVENTION

The present invention relates to a coin operated dispensing apparatus for dispensing individual units of a product or products, selected by the user.

The dispensing apparatus is comprised of a housing, including a base, top of base, cabinet, and a removable top lid. The base, top of base, and cabinet are coupled together. The top of base separates the coin receiving area in the base and the product area within the main display compartment contained within the cabinet. The top of base forms a horizontal floor in the main display compartment and is disposed in parallel, spaced relation above the base of the housing. The cabinet extends upwards from the floor to the top lid. The cabinet is surrounded on four sides by transparent windows, such as a front wall, back wall, and opposite side walls of the main display compartment.

A handle located above the housing top lid is attached to a shaft by a cap and a "c" clip, extending vertically downward through the top lid, an upper turn plate, central column, core structure, and the floor of the main display compartment to terminate within the base below the floor. The insertion of a hitch pin into a hole in the steel shaft below the floor locks the housing together. The hitch pin is accessed through a locked door in the base of the housing, and acts as a locking means to prevent removal of the top lid by unauthorized persons who might otherwise gain access to the products contained within the main display compartment.

A carousel is rotatably supported within the main display compartment between the floor thereof, and the top lid of the housing. The carousel includes a plurality of vertically oriented guides, each structured and disposed to contain individual product units such as golf balls in a vertically stacked array. The carousel has an upper turn plate and a lower turn plate all rotating about a central column and core structure with pin. The core structure is supported on the floor of the main display compartment. The carousel is rotated by the handle located above the housing, the handle engaged a square receptacle in the upper turn plate so as to rotate the carousel to position desired product above the drop hole. The lower turn plate has groves along its innermost circular surface corresponding to product dispensing locations which interact with a pin located in the core structure so as to assist in product alignment above the drop hole. As the carousel is rotated from one dispensing position to another the pin is depressed and becomes uncompressed when the grove of the next dispensing position is encountered. The lower turn plate has channels on its underside which interacts with a locking pin located in the dispensing mechanism's slide cut-off assembly so as to control product dispensing. Upon rotation of the carousel, the pin acts as a stop element serving to sequentially align the desired vertical guide above the drop hole, such that a lower most product unit will be dropped into the drop hole.

The floor of the main display compartment includes a recessed channel formed therein, a drop hole formed therein, and a cut-out channel adapted to receive the slide cut-off assembly in sliding relation therein.

The dispensing mechanism includes a slide cut-off assembly moving below a cover sheet. The slide cut-off assembly is made up of an upper plate which slides in a recessed channel formed in the floor of the main display compartment, a push bar, drop shelf, and a locking pin. The push bar and drop shelf, which are located below the floor slide in the cut-out channel in the floor, and are attached to the upper plate. A locking pin extends upward from the push bar through the upper plate to interact with the lower turn plate of the carousel. The pin must encounter a channel in the underside of the lower turn plate to allow the inward movement of the slide cut-off assembly to the locking position of the coin mechanism. A coin conventional operated release normally maintains the slide assembly in the relaxed position, preventing inward sliding movement to the extended position and thereby preventing dispensing of the product units. Once a predetermined size and number of coin is deposited into the coin mechanism, the inward movement of the slide assembly is allowed. Once the locking position of the coin mechanism is encountered rotation of the carousel will not be allowed, and procedure to extended position, product dispensing, and subsequent return to relaxed position will be necessary before another product may be selected by the customer.

The slide assembly further includes attachment to the housing base front wall with a spring element, the slide assembly being moveable between the relaxed position in which the upper plate cuts off stacked product and an extended position, wherein the free end of the slide assembly is pushed inward by a coin mechanism pushing on the push bar. The drop hole formed in, and extending below the floor of the main display compartment has a height approximately equal to that of a golf ball to receive a single product unit therein. Movement of the upper plate inward from the relaxed position serves to move the product unit positioned above the drop hole downward until it encounters the drop shelf of the slide cut-off assembly. Once the slide cut-off assembly has come to the extended position it is assisted in its return to the relaxed position by a spring element and a pull bar.

A drop chute is located internally adjacent to the front wall of the base and below the extended position of the drop shelf. Upon return of the slide assembly to the relaxed position, the upper plate cuts off staked product above the floor, and the movement of the drop shelf allows the product unit within the drop hole to be dropped down onto the drop chute and exit the machine at the dispensing location to the customer.

DESCRIPTION OF THE DRAWINGS

For a fuller understanding of the nature of the present invention, reference should be made to the following detailed description taken in connection with the accompanying drawings, in which:

FIG. 9 is a sectional view taken along the plane of the line indicated by the arrows D—D of FIG. 6, with the slide assembly in its relaxed position.

FIG. 10 is a sectional view taken along the line E—E of FIG. 7, FIG. 8, FIG. 9.

DETAILED DESCRIPTION OF THE PREFERRED EMBODIMENT

Figure 1:
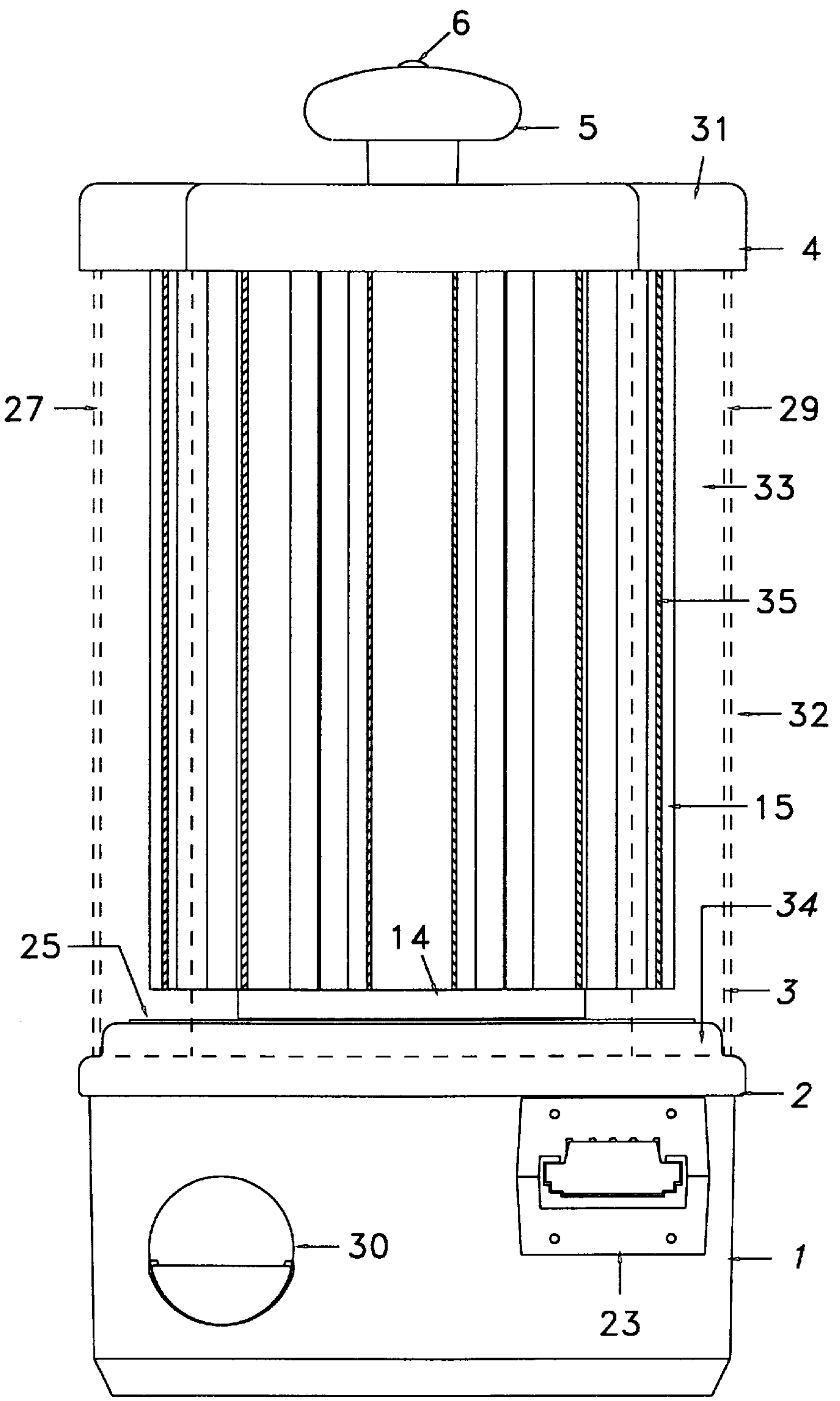
FIG. 1 is a front view of the dispensing apparatus of the present invention.
Figure 2:
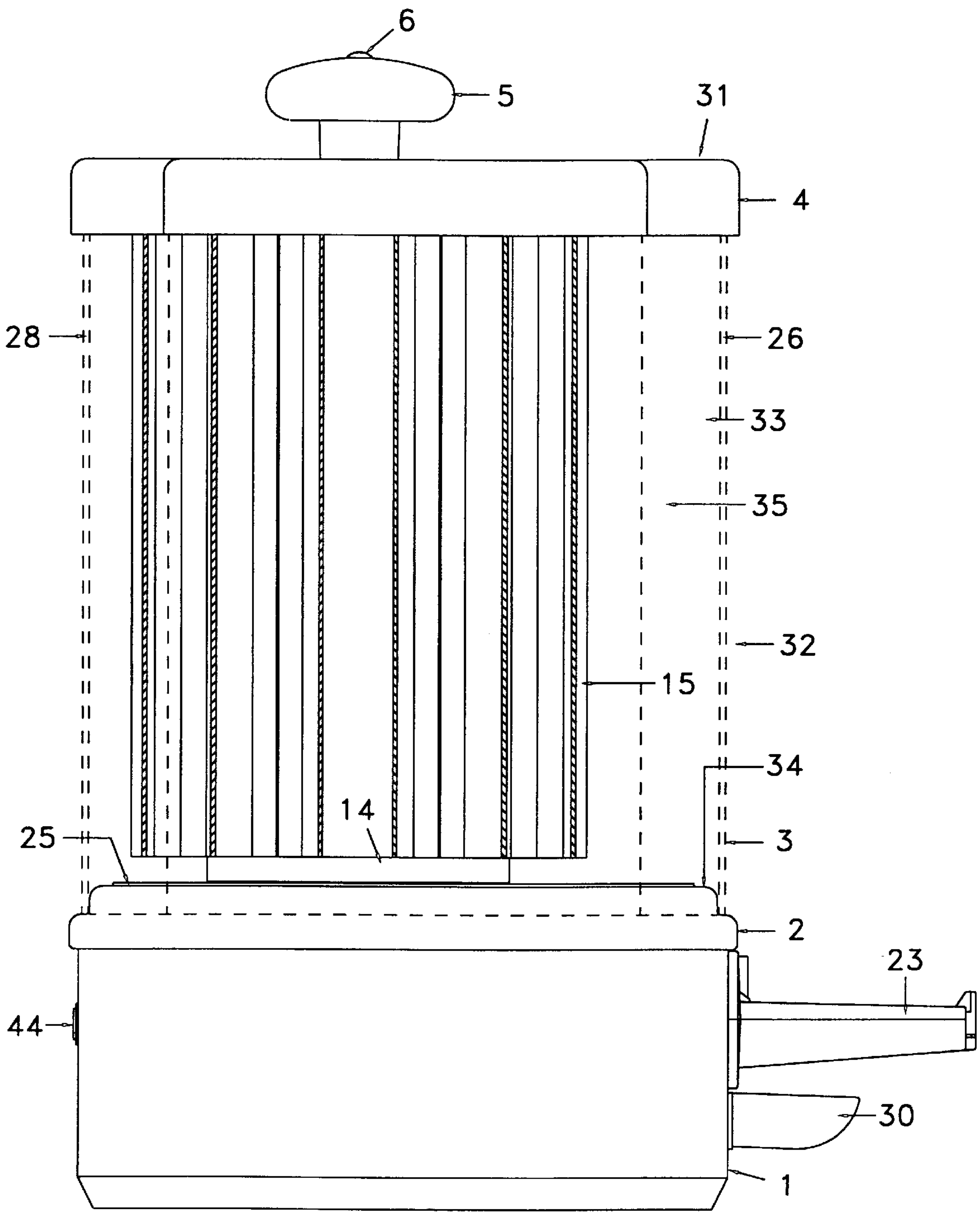
FIG. 2 is a left side view of the dispensing apparatus of the present invention
Figure 3:
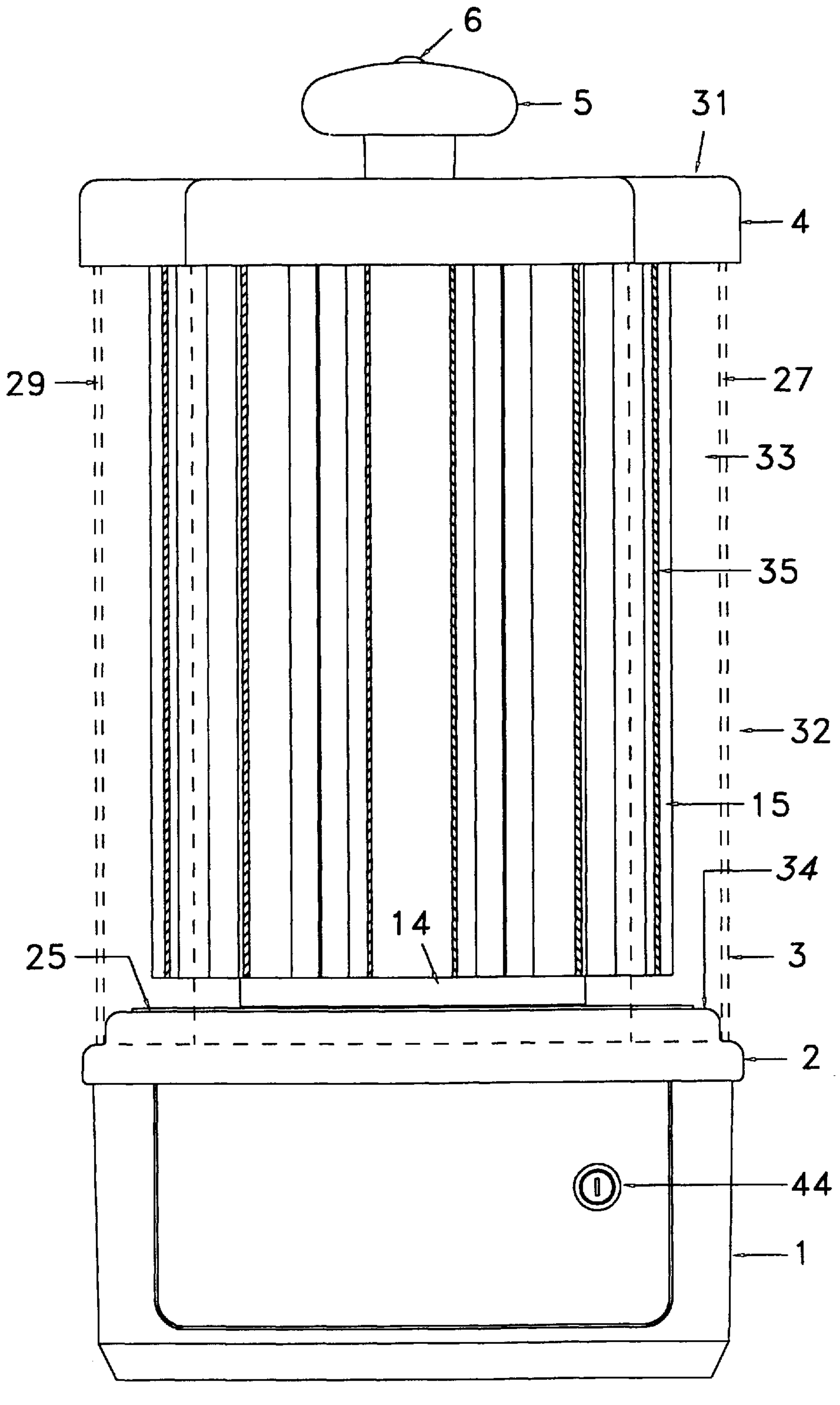
FIG. 3 is a rear view of the dispensing apparatus of the present invention
Figure 4:
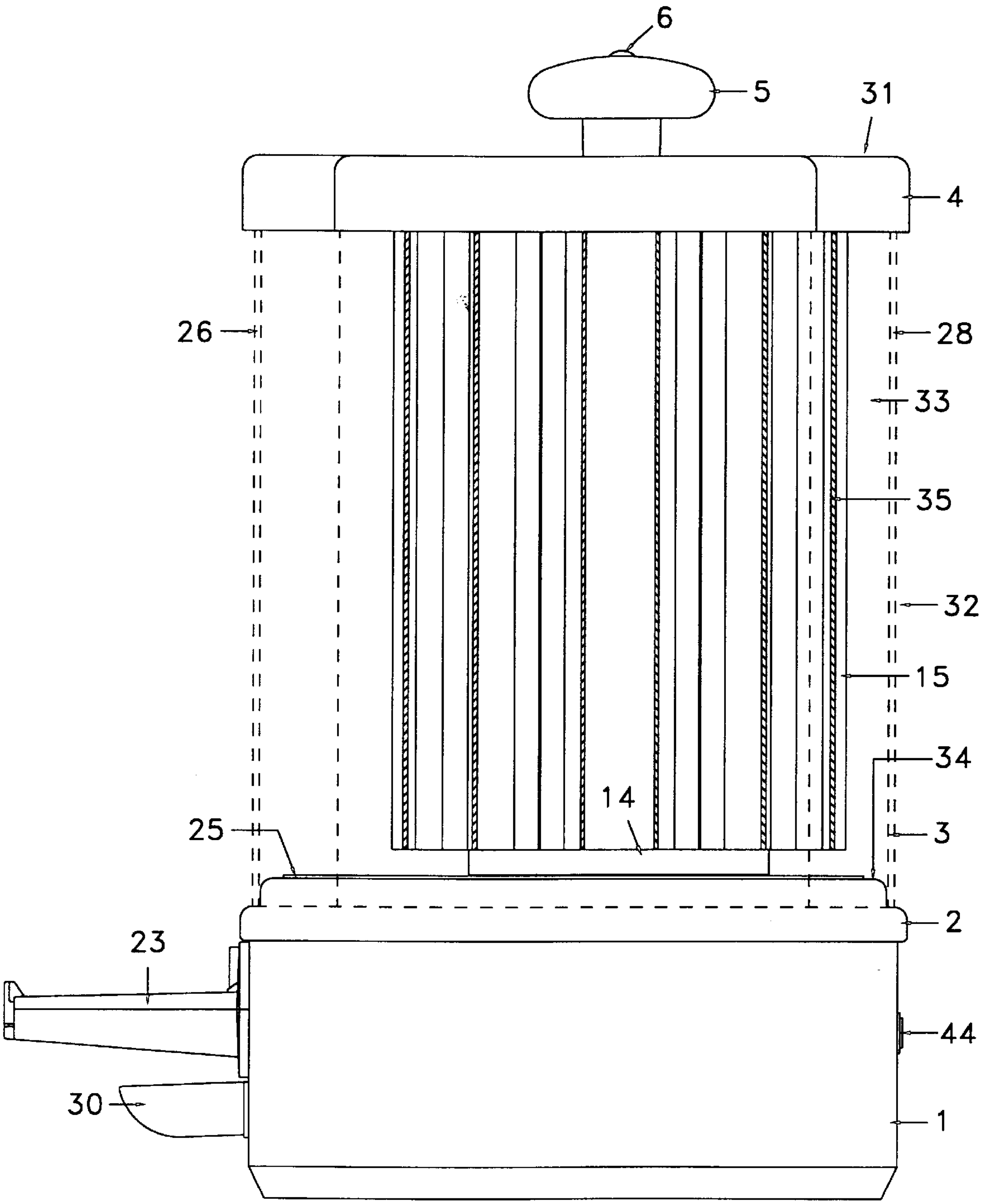
FIG. 4 is a right side view of the dispensing apparatus of the present invention
Figure 5:
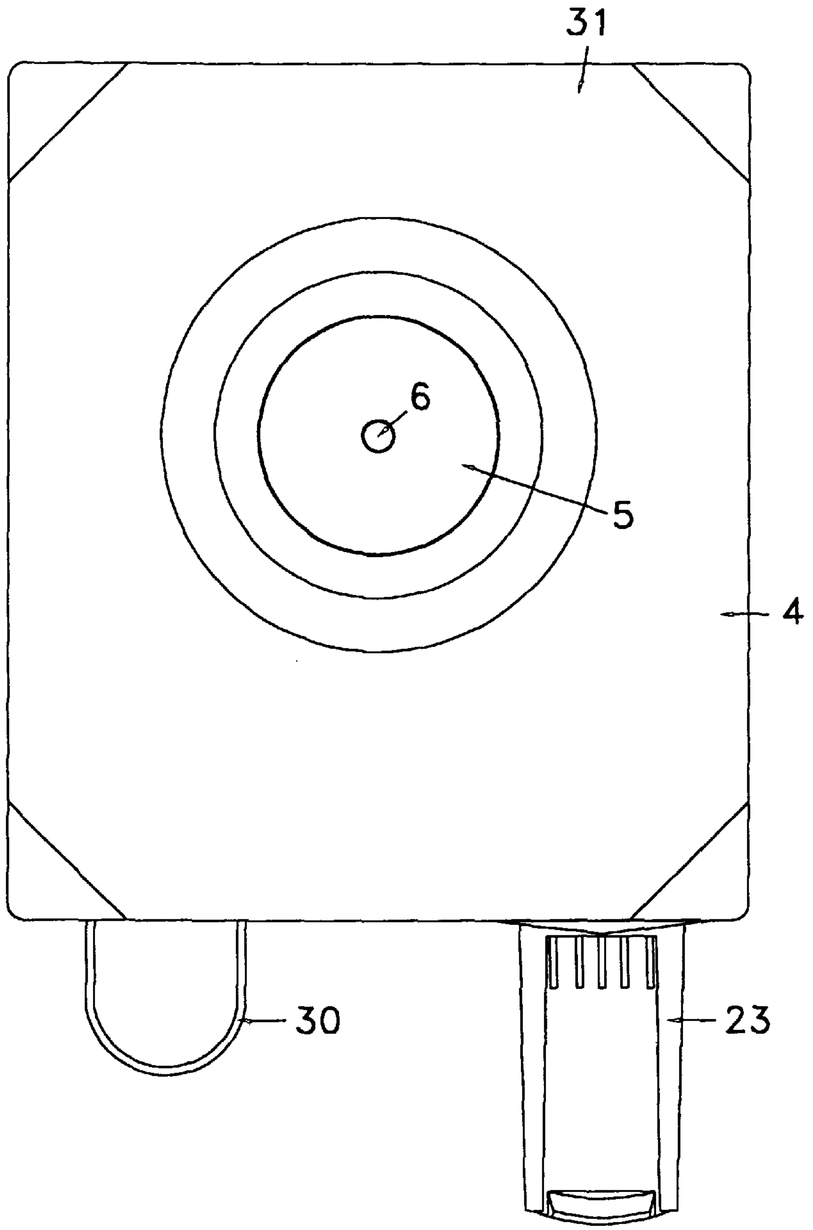
FIG. 5 is a top view of the dispensing apparatus of the present invention
Figure 6:
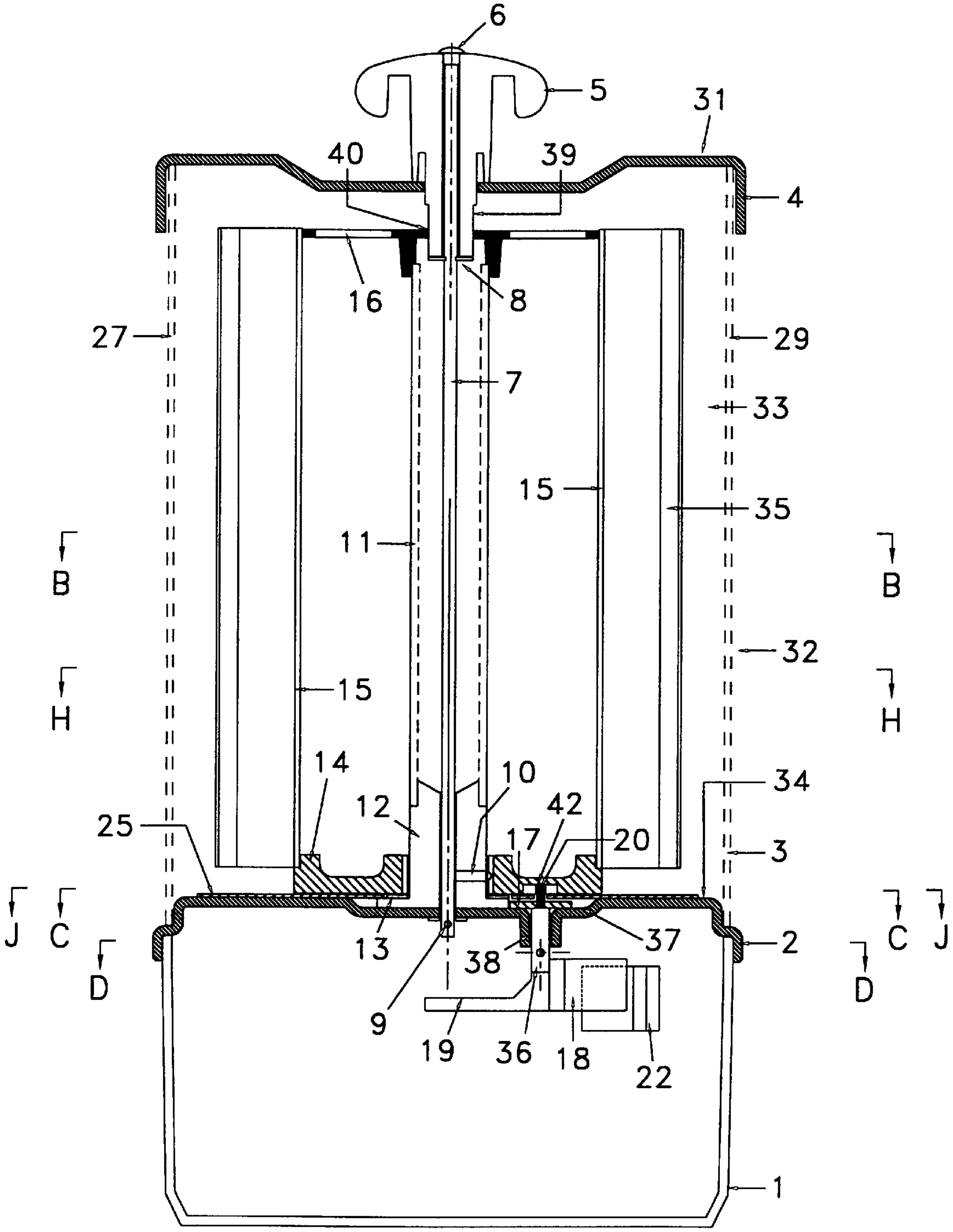
FIG. 6 is a sectional view taken along the plane of the line indicated by the arrows A—A of FIG. 7, FIG. 8, FIG. 9.
Figure 7:
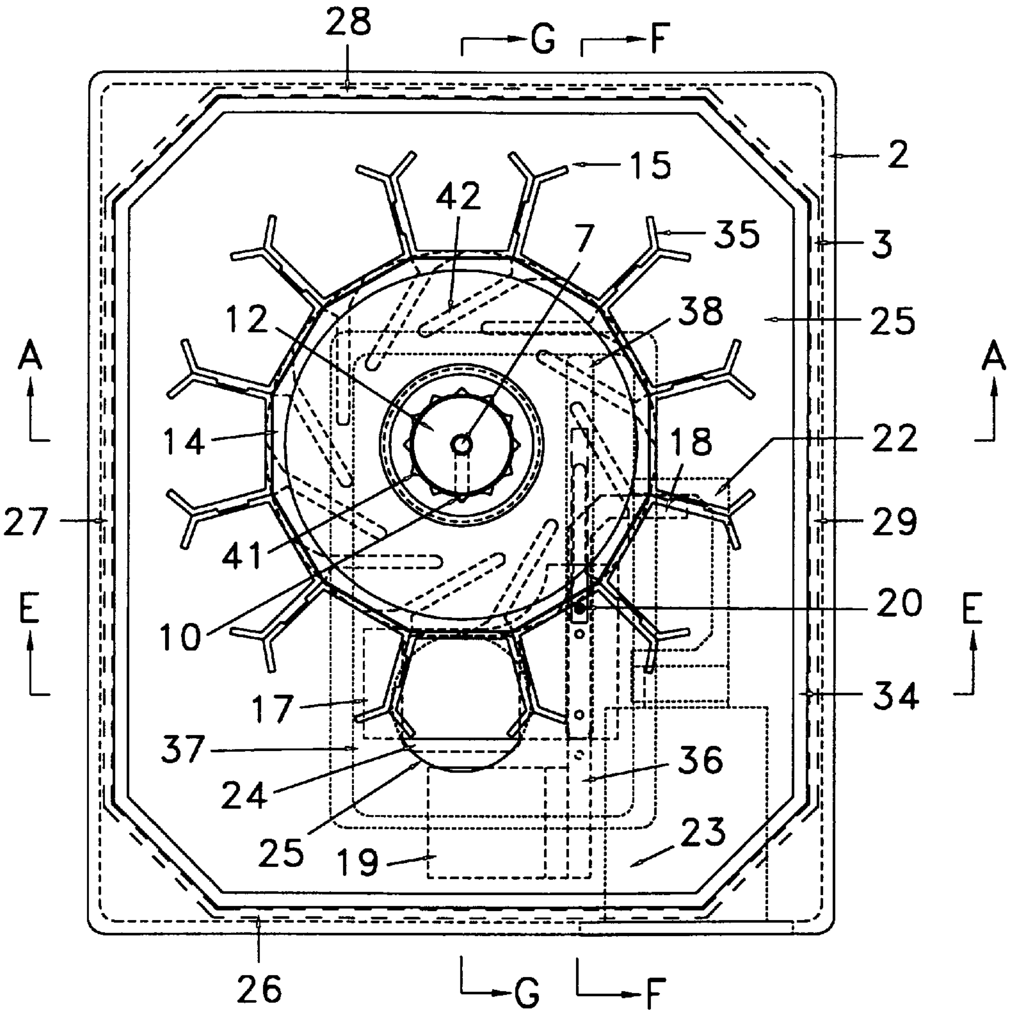
FIG. 7 is a sectional view taken along the plane of the line indicated by the arrows B—B of FIG. 6, with the coin mechanism in its relaxed position.
Figure 8:
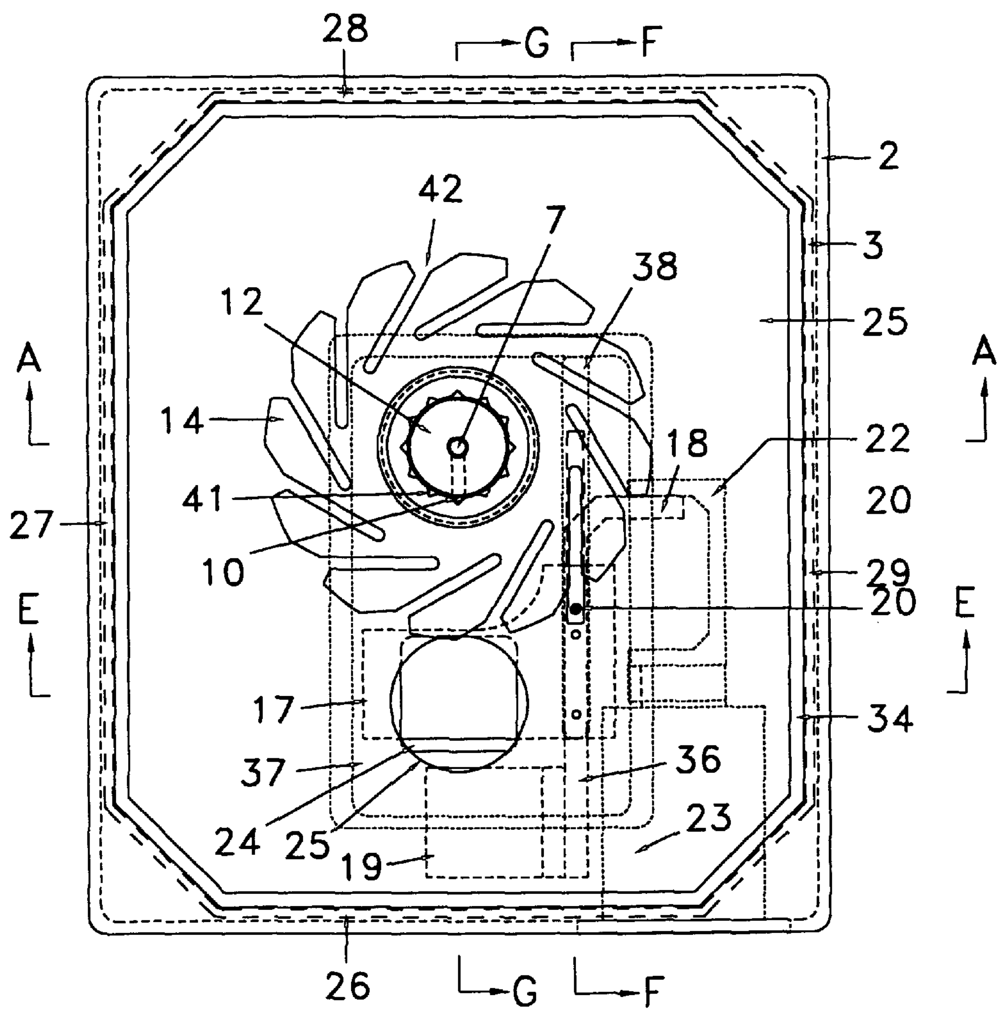
FIG. 8 is a sectional view taken along the plane of the line indicated by the arrows C—C of FIG. 6, with the coin mechanism in its relaxed position.
Figure 11:
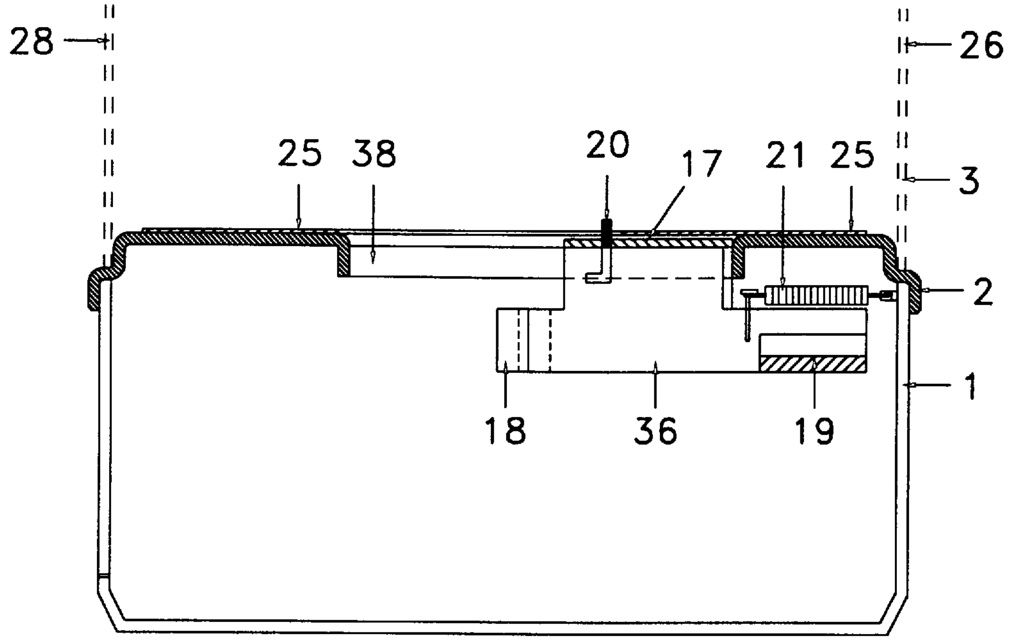
FIG. 11 is a sectional view taken along the line G—G of FIG. 7, FIG. 9, with slide assembly in its relaxed position.
Figure 12:
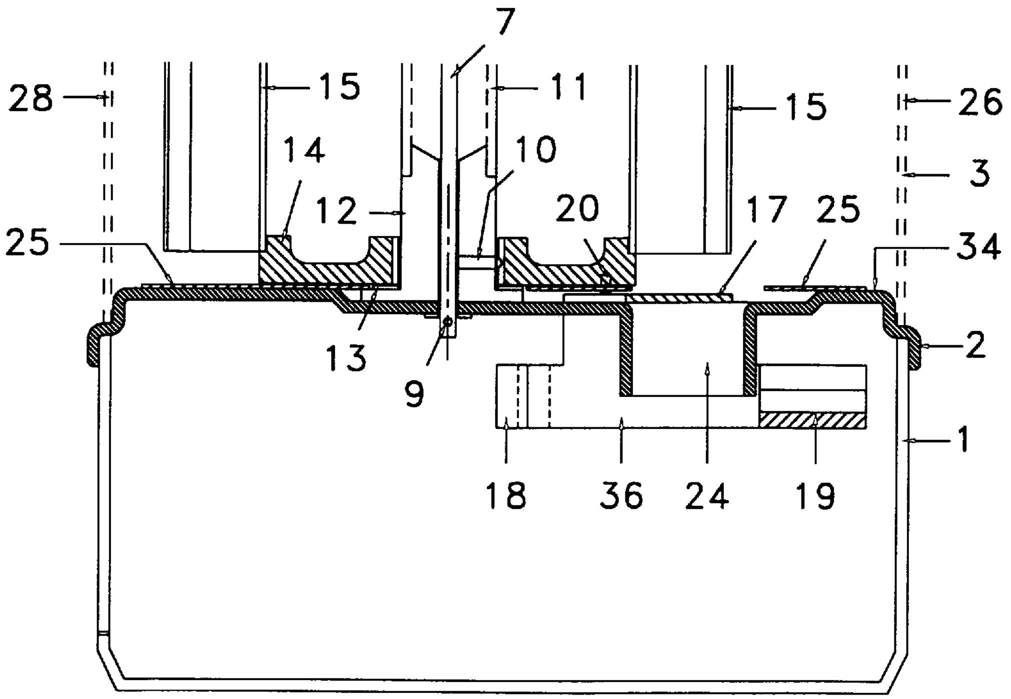
FIG. 12 is a sectional view taken along the line G'—G', of FIG. 8, FIG. 9, with slide assembly in its relaxed position.
Figure 13:
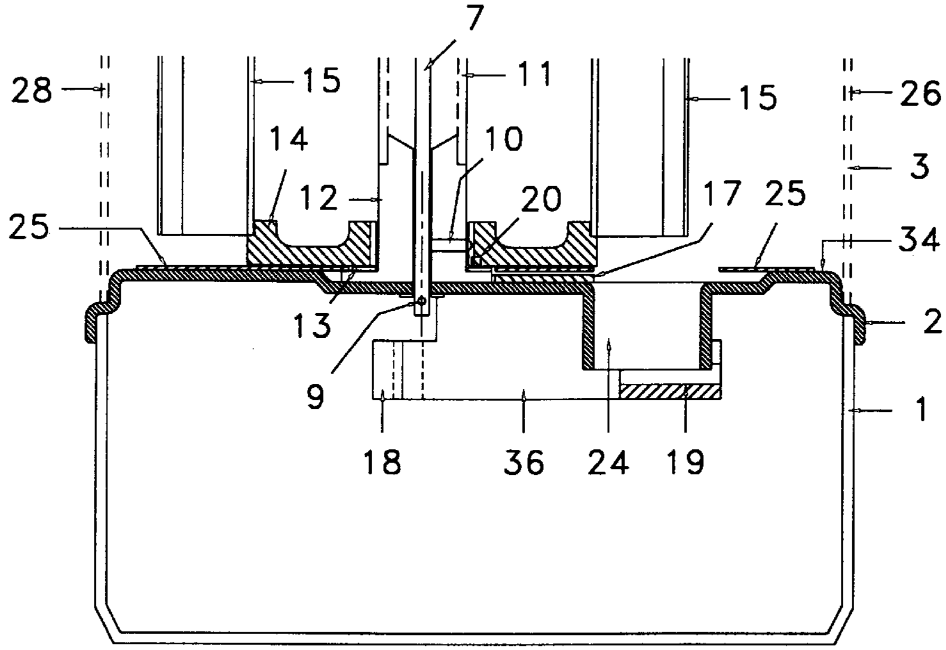
FIG. 13 is sectional view taken along the line F—F of FIG. 7, FIG. 9, with slide assembly in its extended position.
Figure 14:
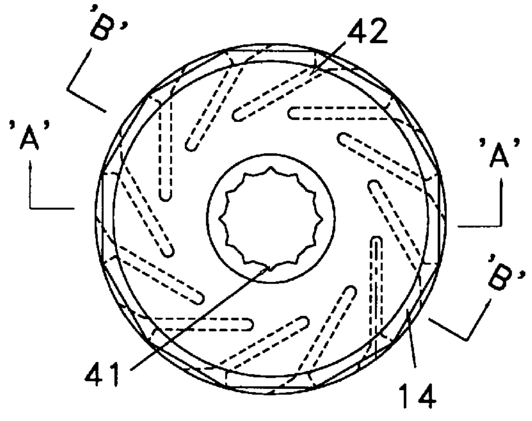
FIG. 14 is a plan view of the lower turn plate of the carousel.
Figure 14A:
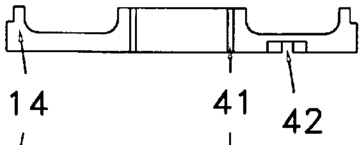
FIG. 14A is view, a sectional view taken along line A—A FIG 14.
Figure 14B:
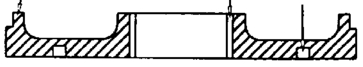
FIG. 14B is a sectional of view along the line B—B of FIG. 14.
Figure 14C:
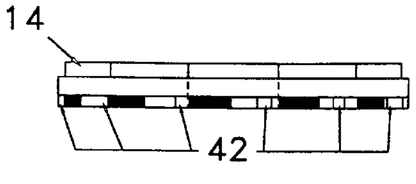
FIG. 14C is a front view of the lower turn plate of the carousel.
Figure 15:
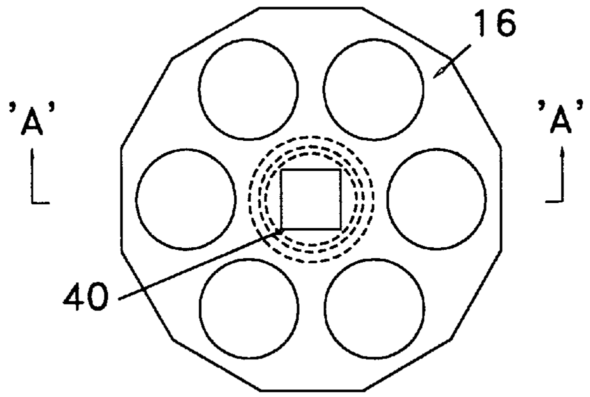
FIG. 15 is a plan view of the upper turn plate of the carousel.
Figure 15A:
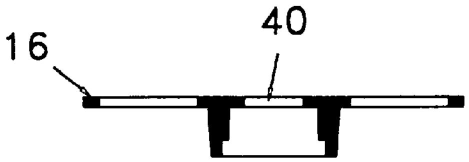
FIG. 15A is a sectional view taken along line A—A of FIG. 15.
Figure 15B:
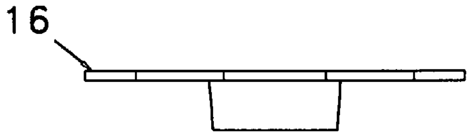
FIG. 15B, a front view of the upper turn plate of the carousel.
Figure 16:
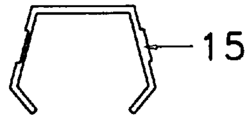
FIG. 16 is a plan view of one of the vertical guides.
Figure 17:
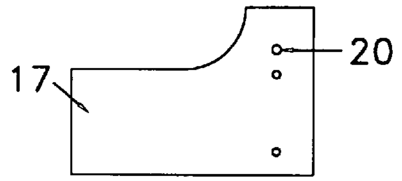
FIG. 17 is a plan view of the upper plate of the cut-off assembly.
Figure 18B:
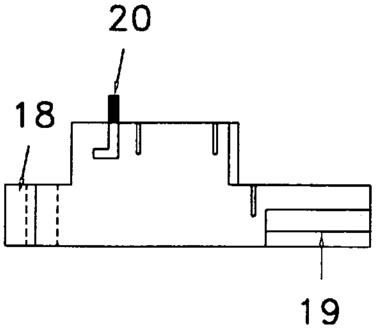
FIG. 18B is a left side view of the slide cut-off assembly.
Figure 18A:
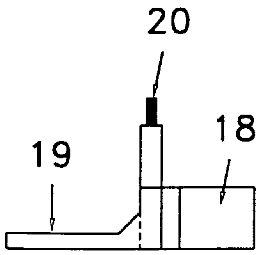
FIG. 18A is a front view, of the slide cut-off assembly.
Figure 18:
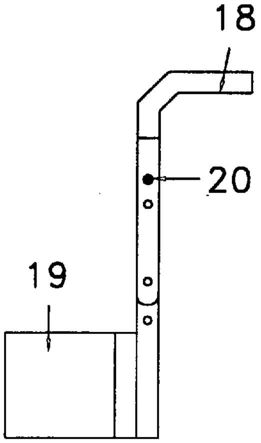
FIG. 18 is a plan view, of the slide cut-off assembly.

Referring initially to FIGS. 1–5, the dispensing apparatus of the present invention, generally indicated as (31), is illustrated.

The dispensing apparatus (31) is comprised of a housing (32), including a base (1), top of base (2), cabinet (3), and a removable top lid (4). The base (1), top of base (2), and cabinet (3) are coupled together. The top of base (2) separates the coin receiving area in the base (1) and the product area within the main display compartment (33) contained within the cabinet (3). The top of base (2) forms a horizontal floor (34) in the main display compartment (33) and is disposed in parallel, spaced relation above the base (1) of the housing (32). The cabinet (3) extends upwards from the floor (34) to the top lid (4). The cabinet (3) is surrounded on four sides by transparent windows, such as a front wall (26), back wall (28), and opposite side walls (27)(29) of the main display compartment (33).

A handle (5) located above the housing (32) top lid (4) is attached to a shaft (7) by a cap (6) and a "c" clip (8), extending vertically downward through the top lid (4), an upper turn plate (16), central column (11), core structure (12), and the floor (34) of the main display compartment (33) to terminate within the base (1) below the floor (34). The insertion of a hitch pin into a hole (9) in the steel shaft (7) below the floor (34) locks the housing (32) together. The hitch pin is accessed through a locked door (44) in the base (1) of the housing (32), and acts as a locking means to prevent removal of the top lid (4) by unauthorized persons who might otherwise gain access to the products contained within the main display compartment (33).

A carousel (35) is rotatably supported within the main display compartment (33) between the floor (34) thereof, and the top lid (4) of the housing (32). The carousel (35) includes a plurality of vertically oriented guides (15), each structured and disposed to contain individual product units such as golf balls in a vertically stacked array. The carousel (35) has an upper turn plate (16) and a lower turn plate (14) all rotating about a central column (11) and core structure (12) with pin (10). The core structure (12) is supported on the floor (34) of the main display compartment (33). The carousel (35) is rotated by the handle (5) located above the housing (32), the handle (5) engages a square receptacle (40) in the upper turn plate (16) so as to rotate the carousel (35) to position desired product above the drop hole (24). The lower turn plate (14) has grooves (41) along its innermost circular surface corresponding to product dispensing locations which interact with a pin (10) located in the core structure (12) so as to assist in product alignment above the drop hole (24). As the carousel (35) is rotated from one dispensing position to another the pin (10) is depressed and becomes uncompressed when the grove (41) of the next dispensing position is encountered. The lower turn plate (14) has channels (42) on its underside which interacts with a locking pin (20) located in the dispensing mechanism's slide cut-off assembly (36) so as to control product dispensing. Upon rotation of the carousel (35), the pin (10) acts as a stop element serving to sequentially align the desired vertical guide (15) above the drop hole (24), such that a lower most product unit will be dropped into the drop hole (24).

The floor (34) of the main display compartment (33) includes a recessed channel (37) formed therein, a drop hole (24) formed therein, and a cut-out channel (38) adapted to receive the slide cut-off assembly (36) in sliding relation therein.

The dispensing mechanism includes a slide cut-off assembly (36) moving below a cover sheet (25). The slide cut-off assembly (36) is made up of an upper plate (17) which slides in a recessed channel (37) formed in the floor (34) of the main display compartment (33), a push bar (18), drop shelf (19), and a locking pin (20). The molded push bar (18) and drop shelf (19), which are located below the floor (34) slide in the cut-out channel (38) in the floor (34), and are attached to the upper plate (17). A locking pin (20) extends upward from the push bar through the upper plate (17) to interact with the lower turn plate (14) of the carousel (35). The pin (20) must encounter a channel (42) in the underside of the lower turn plate (14) to allow the inward movement of the slide cut-off assembly (36) to the locking position of the coin mechanism (23). A conventional coin operated release normally maintains the slide cut-off assembly (36) in the relaxed position, preventing inward sliding movement to the extended position and thereby preventing dispensing of the product units. Once a predetermined size and number of coin is deposited into the coin mechanism (23), the inward movement of the slide cut-off assembly (36) is allowed. Once the locking position of the coin mechanism (23) is encountered rotation of the carousel (35) will not be allowed, and procedure to extended position, product dispensing, and subsequent return to relaxed position will be necessary before another product may be selected by the customer.

The slide cut-off assembly (36) further includes attachment to the housing (32) base (1) front wall with a spring element (21), the slide cut-off assembly (36) being moveable between the relaxed position in which the upper plate (17) cuts off stacked product and an extended position, wherein the free end of the slide cut-off assembly (36) is pushed inward by a coin mechanism (23) pushing on the push bar (18). The drop hole (24) formed in, and extending below the floor (34) of the main display compartment (33) has a height approximately equal to that of a golf ball to receive a single product unit therein. Movement of the upper plate (17) inward from the relaxed position serves to move the product unit positioned above the drop hole (24) downward until it encounters the drop shelf (19) of the slide cut-off assembly (36). Once the slide cut-off assembly (36) has come to the extended position it is assisted in its return to the relaxed position by a spring element (21) and a pull bar (22).

A drop chute (24) is located internally adjacent to the front wall of the base (1) and below the extended position of the drop shelf (19). Upon return of the slide cut-off assembly (36) to the relaxed position, the upper plate (17) cuts off staked product above the floor (34), and the movement of the drop shelf (19) allows the product unit within the drop hole (24) to be dropped down onto the drop chute and exit the machine at the dispensing location (30) to the customer.

Now that the invention has been described,

What is claimed:

1. A dispensing apparatus for dispensing individual product units, said apparatus comprising:

- a base;
- a cabinet mounted on a top side of the base and including a display compartment;
- a carousel rotatably supported within the display compartment and including a plurality of vertically oriented product guides in an annular array, each product guide structured and disposed to contain a column of product units;
- a floor between the carousel and the base;
- a drop hole through the floor for receiving product units from the carousel, the drop hole being sized and configured to receive a single product unit therein;
- a handle connected to the carousel for selectively rotating the carousel for aligning the guides over the drop hole;
- a dispensing mechanism comprising:
  - a slide cut-off assembly including:
    - an upper plate between the floor and the carousel;
    - a drop shelf offset horizontally from the upper plate and at a level below the drop hole;
  - a slide mounting mechanism mounting the slide cut-off assembly for movement between a relaxed position in which the upper plate is positioned above the drop hole and the drop shelf is offset from the drop hole, and an extended position in which the upper plate is offset from the drop hole and the drop shelf is positioned below the drop hole;
  - resilient means biasing the slide cut-off assembly towards the relaxed position;
- a carousel alignment mechanism for aligning the respective product guides above the drop hole; and
- a manually operated mechanism for selectively moving the slide cut-off assembly from the relaxed position to the extended position.

2. A dispensing apparatus according to claim 1 including a carousel locking mechanism comprising:

- a lower turn plate mounted on the carousel for rotation therewith and having a plurality of channels therein; and
- a locking pin mounted on the slide cut-off assembly and projecting upwardly therefrom, the locking pin engaging in one of the channels in response to movement of the slide cut-off assembly to the extended position.

3. A dispensing apparatus according to claim 2 the channels in the lower turn plate correspond to respective ones of the product guides.

4. A dispensing apparatus according to claim 3 including a coin operated release for locking the slide cut-off assembly in the relaxed position and releasable in response to the introduction of selected coins to allow the slide cut-off to move to the extended position.

* * * * *